United States Patent
Uchida et al.

(10) Patent No.: US 9,631,544 B2
(45) Date of Patent: Apr. 25, 2017

(54) COOLING SYSTEM AND VEHICLE THAT INCLUDES COOLING SYSTEM

(71) Applicants: Kazuhide Uchida, Hamamatsu (JP); Yuichi Ohno, Nishio (JP); Yoshiaki Kawakami, Nagoya (JP)

(72) Inventors: Kazuhide Uchida, Hamamatsu (JP); Yuichi Ohno, Nishio (JP); Yoshiaki Kawakami, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 14/384,429

(22) PCT Filed: Mar. 7, 2013

(86) PCT No.: PCT/IB2013/000308
§ 371 (c)(1),
(2) Date: Sep. 11, 2014

(87) PCT Pub. No.: WO2013/136148
PCT Pub. Date: Sep. 19, 2013

(65) Prior Publication Data
US 2015/0052928 A1 Feb. 26, 2015

(30) Foreign Application Priority Data

Mar. 16, 2012 (JP) .................................. 2012-059855

(51) Int. Cl.
*F25B 1/06* (2006.01)
*F01P 3/00* (2006.01)
(Continued)

(52) U.S. Cl.
CPC ............ *F01P 3/00* (2013.01); *B60H 1/00278* (2013.01); *B60H 1/323* (2013.01); *B60H 1/3213* (2013.01);
(Continued)

(58) Field of Classification Search
CPC .... B60H 2001/3288; B60H 2001/3298; B60H 2001/00307; B60H 1/323; B60H 1/3213;
(Continued)

(56) References Cited

U.S. PATENT DOCUMENTS 4,275,570 A * 6/1981 Szymaszek ............. F25B 43/02
62/468
2006/0156745 A1* 7/2006 Ikegami ................... F25B 5/00
62/170
(Continued)

FOREIGN PATENT DOCUMENTS

JP      A-55-99551      7/1980
JP      A-2-64362      3/1990
(Continued)

OTHER PUBLICATIONS

Apr. 2, 2014 Partial English Translation of Office Action issued in Japanese Application No. 2012-059855.

*Primary Examiner* — Len Tran
*Assistant Examiner* — Ana Vazquez
(74) *Attorney, Agent, or Firm* — Oliff PLC

(57) ABSTRACT

A cooling system includes: a compressor; a first condenser; a cooling portion; a heat exchanger; a first line; a second line; a switching device; and an ejector. The first line forms a vapor compression refrigeration cycle by flowing refrigerant in order of the heat exchanger, the compressor, the first condenser and the cooling portion. The second line forms a heat pipe by circulating refrigerant between the first condenser and the cooling portion. The switching device flows refrigerant through the first line when air conditioning is performed, and flows refrigerant through the second line when air conditioning is stopped. The ejector is configured to, when refrigerant flows from the compressor to the first condenser via the ejector, draw refrigerant from the second (Continued)

line and join the drawn refrigerant into refrigerant from the compressor.

8 Claims, 7 Drawing Sheets

(51) Int. Cl.
B60H 1/00 (2006.01)
B60H 1/32 (2006.01)
(52) U.S. Cl.
CPC ...... *F25B 1/06* (2013.01); *B60H 2001/00307* (2013.01); *B60H 2001/3288* (2013.01); *B60H 2001/3298* (2013.01); *F01P 2003/001* (2013.01)
(58) Field of Classification Search
CPC ... B60H 1/00278; F01P 2003/001; F01P 3/00; F25B 1/06
USPC .......................................................... 62/500
See application file for complete search history.

(56) References Cited

U.S. PATENT DOCUMENTS

| | | | |
|---|---|---|---|
| 2007/0186572 A1* | 8/2007 | Nishida | F25B 41/00 62/170 |
| 2011/0113800 A1 | 5/2011 | Sekiya et al. | |
| 2012/0085114 A1* | 4/2012 | Graaf | B60H 1/00278 62/238.7 |

FOREIGN PATENT DOCUMENTS

| | | |
|---|---|---|
| JP | A-2000-73763 | 3/2000 |
| JP | A-2002-310520 | 10/2002 |
| JP | A-2005-90862 | 4/2005 |
| JP | A-2005-271906 | 10/2005 |
| JP | A-2007-69733 | 3/2007 |
| JP | A-2008-08577 | 1/2008 |
| JP | A-2009-229014 | 10/2009 |
| JP | A-2011-85294 | 4/2011 |
| JP | A-2011-105150 | 6/2011 |

* cited by examiner

FIG. 5

| MODE | VALVE 28 | VALVE 57 | VALVE 58 |
|---|---|---|---|
| AIR CONDITIONER OPERATION MODE | OPENING DEGREE IS ADJUSTED SUCH THAT SUFFICIENT AMOUNT OF REFRIGERANT FLOWS THROUGH COOLING PORTION 30 | | FULLY CLOSED |
| HEAT PIPE OPERATION MODE | FULLY CLOSED | FULLY CLOSED | FULLY OPEN |

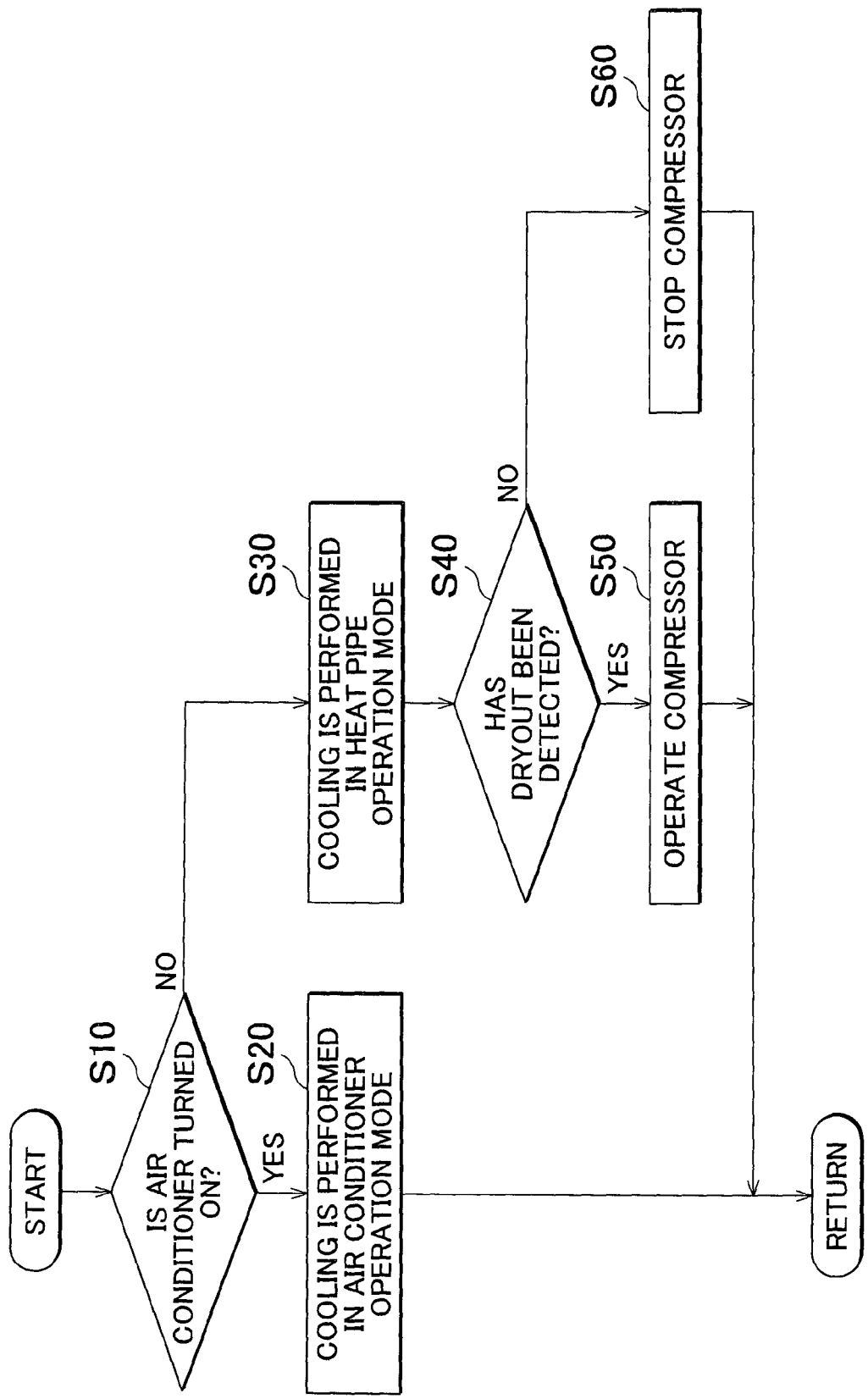

COOLING SYSTEM AND VEHICLE THAT INCLUDES COOLING SYSTEM

BACKGROUND OF THE INVENTION

1. Field of the Invention

The invention relates to a cooling system and a vehicle that includes the cooling system and, more particularly, to a cooling system that cools a heat generating source by utilizing a vapor compression refrigeration cycle and a vehicle that includes the cooling system.

2. Description of Related Art

In recent years, hybrid vehicles, fuel cell vehicles, electric vehicles, and the like, that run with driving force of a motor become a focus of attention as one of measures against environmental issues. In such vehicles, electrical devices, such as a motor, a generator, an inverter, a converter and a battery, exchange electric power to generate heat. Therefore, these electrical devices need to be cooled.

Japanese Patent Application Publication No. 2000-73763 (JP 2000-73763 A) describes a cooling system for a hybrid vehicle. The cooling system includes a first cooling circuit, a second cooling circuit and a third cooling circuit. The first cooling circuit selectively or simultaneously cools a power control unit that executes drive control over a drive motor, an engine cylinder head and the drive motor. The second cooling circuit cools an engine cylinder block. The third cooling circuit cools the power control unit. The cooling system switches a circulation path of coolant among the cooling circuits on the basis of the operating states of an engine, motor and air conditioner. Other than JP 2000-73763 A, a technique relating to a cooling device or cooling system is described in Japanese Patent Application Publication No. 2005-90862 (JP 2005-90862 A), Japanese Patent Application Publication No. 2007-69733 (JP 2007-69733 A), Japanese Patent Application Publication No. 2009-229014 (JP 2009-229014 A), Japanese Patent Application Publication No. 2005-271906 (JP 2005-271906 A), and the like.

In the above-described cooling system, an engine cooling system and a hybrid cooling system that cools the power control unit, and the like, are provided, and flow passages between these cooling systems are switched by control valves. Therefore, the configuration of the cooling system becomes complex, so cost increases.

In contrast to this, it is conceivable to cool hybrid electrical devices by utilizing an air conditioner cooling system. By so doing, it is possible to reduce cost by simplifying the hybrid cooling system. Furthermore, in this case, when the air conditioner is stopped, it is conceivable that the hybrid electrical devices are cooled without operating a compressor by forming a heat-pipe cooling circuit and, by so doing, power consumption is reduced.

However, in the heat-pipe cooling circuit, a phenomenon called dryout that all the refrigerant dries out may occur if the amount of refrigerant in a heat-pipe cycle is short with respect to the amount of heat radiation that is required to protect a heat generating source, such as the hybrid electrical devices. When dryout occurs, the performance of cooling the heat generating source decreases, so the temperature of the heat generating source problematically increases. In terms of this point, no measures are taken into consideration for the above-described cooling system for a hybrid vehicle.

SUMMARY OF THE INVENTION

The invention provides a cooling system that is able to suppress dryout in a heat pipe cycle and a vehicle that includes the cooling system.

An aspect of the invention provides a cooling system that includes: a compressor, a first condenser, a cooling portion; a heat exchanger; a first line; a second line; a switching device; and an ejector. The compressor compresses refrigerant flowing through the cooling system. The first condenser cools the refrigerant. The cooling portion cools a heat generating source using the refrigerant. The heat exchanger is used to perform air conditioning using the refrigerant. The first line is a line that forms a vapor compression refrigeration cycle by flowing the refrigerant in order of the heat exchanger, the compressor, the first condenser and the cooling portion. The second line is a line that forms a heat pipe by circulating the refrigerant between the first condenser and the cooling portion. The switching device flows the refrigerant through the first line when the air conditioning is performed. The switching device flows the refrigerant through the second line when the air conditioning is stopped. The ejector is provided between the compressor and the first condenser. The ejector is configured to, when the refrigerant flows from the compressor to the first condenser via the ejector, draw the refrigerant from the second line and join the drawn refrigerant into the refrigerant from the compressor.

The ejector may include a first pipe, a second pipe and a confluent portion. The first pipe flows the refrigerant discharged from the compressor. The second pipe is formed on an outer peripheral side of the first pipe. The second line is connected to the second pipe. The confluent portion is a portion that is used to join the refrigerant flowing through the second pipe into the refrigerant flowing through the first pipe. The second line is connected to the second pipe at a location upstream of the confluent portion.

The cooling system may further include a second condenser. The second condenser cools the refrigerant. The first line flows the refrigerant in order of the heat exchanger, the compressor, the first condenser, the cooling portion and the second condenser. The switching device includes a first valve, a second valve and a third valve. The first valve is provided in a first tube. The first tube is provided in parallel with the cooling portion. The first tube flows the refrigerant from the first condenser to the second condenser. The second valve is provided in a second tube. The second tube flows the refrigerant from the cooling portion to the second condenser. The third valve is provided in a third tube. The third tube branches off from the second tube, and flows the refrigerant from the cooling portion to the ejector. When the switching device flows the refrigerant through the first line, the switching device opens the second valve and closes the third valve. When the switching device flows the refrigerant through the second line, the switching device closes the second valve and opens the third valve.

The cooling system may further include a check valve. The check valve interrupts flow of the refrigerant from the first condenser to the compressor.

The cooling portion may be arranged vertically below the first condenser. The cooling system may further include a reservoir. The reservoir stores the refrigerant in a liquid phase, flowing from the first condenser to the cooling portion.

The heat generating source may be an electrical device that is mounted on a vehicle. Another aspect of the invention provides a vehicle that includes any one of the above-described cooling systems.

With the above-described cooling system according to the aspect of the invention, the cooling system includes the ejector provided between the compressor and the first condenser. When the refrigerant flows from the compressor to the first condenser, the ejector generates suction force for drawing the refrigerant from the second line and joins the refrigerant, flowing through the second line, into the refrigerant discharged from the compressor. By so doing, it is possible to increase the amount of refrigerant in a heat pipe cycle formed between the first condenser and the cooling portion while facilitating circulation of the refrigerant in the heat pipe cycle. Thus, it is possible to provide the cooling system that is able to suppress dryout in the heat pipe cycle and the vehicle that includes the cooling system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a table that shows the opening degrees of valves in each operation mode of the cooling system according to the embodiment, which is shown in FIG. 1;

FIG. 7 is a flowchart that shows an example of a control method for the cooling system according to the embodiment, which is shown in FIG. 1.

DETAILED DESCRIPTION OF EMBODIMENTS

Figure 1:
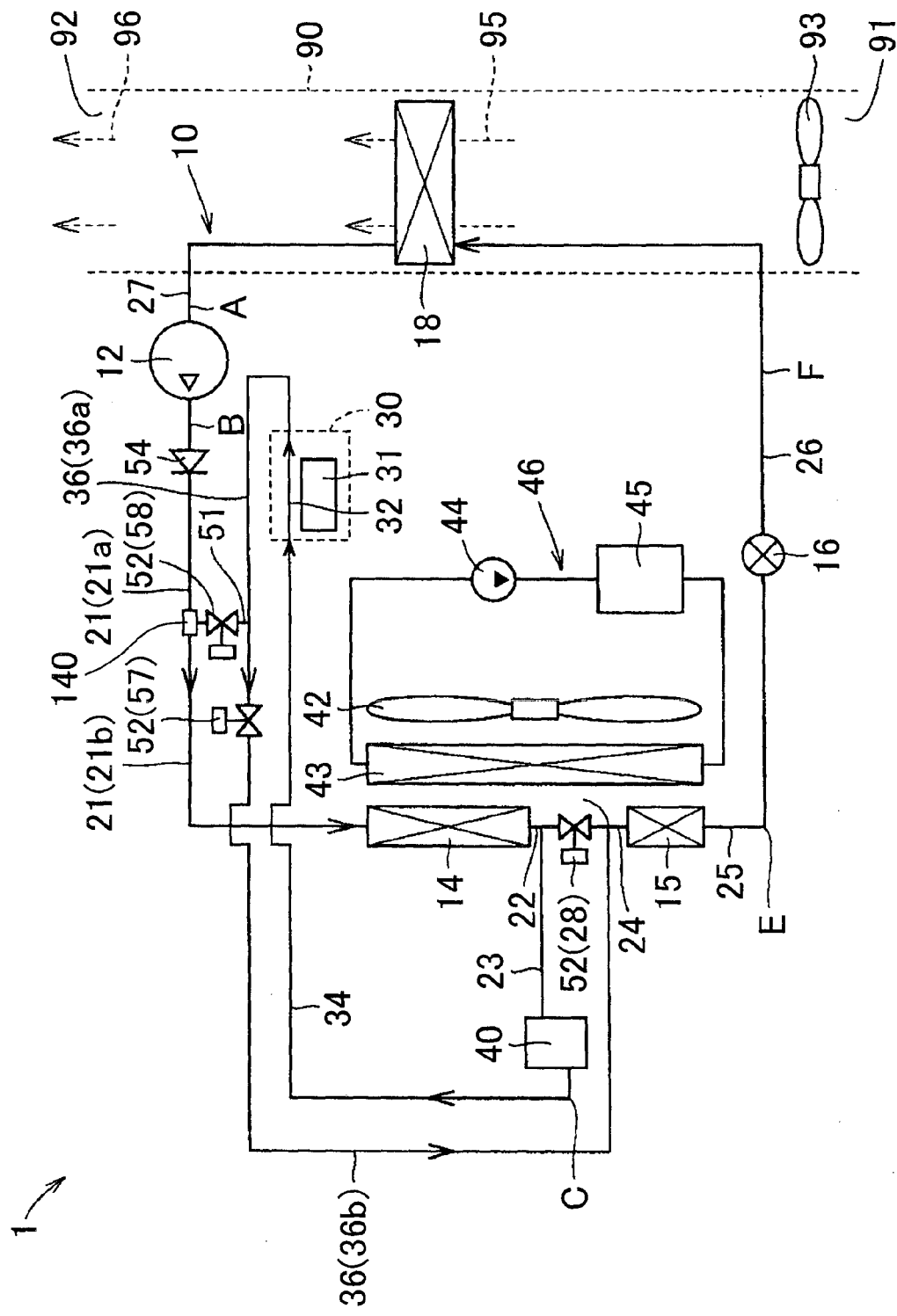
FIG. 1 is a schematic view that shows the configuration of a cooling system according to an embodiment that is one example of the invention.

Hereinafter, an embodiment of the invention will be described in detail with reference to the accompanying drawings. Note that like reference numerals denote the same or corresponding portions in the drawings and the description thereof is not repeated.

FIG. 1 is a schematic view that shows the configuration of a cooling system according to the embodiment of the invention. The cooling system according to the present embodiment is applied to a hybrid vehicle that uses an engine serving as an internal combustion engine and a drive unit serving as an electric motor as power sources, and is used to cool electrical devices that are mounted on the hybrid vehicle.

As shown in FIG. 1, the tooling system 1 includes a vapor compression refrigeration cycle 10 (hereinafter, also simply referred to as "refrigeration cycle 10"). The refrigeration cycle 10 is, for example, mounted on the hybrid vehicle in order to cool the cabin of the hybrid vehicle. Cooling using the refrigeration cycle 10 is performed, for example, when a switch for cooling is turned on or when an automatic control mode in which the temperature in the cabin of the hybrid vehicle is automatically adjusted to a set temperature is selected and the temperature in the cabin is higher than the set temperature.

The refrigeration cycle 10 includes a compressor 12, a first condenser 14, a second condenser 15, an expansion valve 16 and a heat exchanger 18. The refrigeration cycle 10 includes a tank 40. The tank 40 is arranged in a path provided in parallel with a path of refrigerant between the first condenser 14 and the second condenser 15.

The compressor 12 is actuated by the motor or engine equipped for the hybrid vehicle as a power source, and adiabatically compresses refrigerant gas to obtain superheated refrigerant gas. The compressor 12 introduces and compresses gaseous refrigerant flowing from the heat exchanger 18 during operation of the refrigeration cycle 10, and discharges high-temperature and high-pressure gaseous refrigerant to a refrigerant line 21. The compressor 12 discharges refrigerant to the refrigerant line 21 to thereby circulate refrigerant in the refrigeration cycle 10.

The first condenser 14 and the second condenser 15 cause superheated refrigerant gas, compressed in the compressor 12, to release heat to an external medium with a constant pressure and to become refrigerant liquid. High-pressure gaseous refrigerant discharged from the compressor 12 releases heat to the surroundings to be cooled in the first condenser 14 and the second condenser 15 to thereby condense (liquefy). Each of the first condenser 14 and the second condenser 15 includes tubes and fins. The tubes flow refrigerant. The fins are used to exchange heat between refrigerant flowing through the tubes and air around the condenser.

The first condenser 14 and the second condenser 15 carry out heat exchange between cooling air and refrigerant. Cooling air may be supplied to the first condenser 14 and the second condenser 15 by forced draft from a radiator fan 42 provided in a cooling circuit 46 for cooling the engine 45. Coolant that is circulated by a water pump 44 between the engine 45 and a radiator 43 is cooled by forced draft from the radiator fan 42. Cooling air may be supplied to the first condenser 14 and the second condenser 15 by natural draft that is generated as the hybrid vehicle travels. Through heat exchange in the first condenser 14 and the second condenser 15, the temperature of refrigerant decreases, and refrigerant liquefies.

The expansion valve 16 causes high-pressure liquid refrigerant, flowing through a refrigerant line 25, to be sprayed through a small hole to expand into low-temperature and low-pressure atomized refrigerant. The expansion valve 16 decompresses refrigerant liquid, condensed in the first condenser 14 and the second condenser 15, into wet steam in a gas-liquid mixing state. Note that a decompressor for decompressing refrigerant liquid is not limited to the expansion valve 16 that carries out throttle expansion; instead, the decompressor may be a capillary tube.

Atomized refrigerant flowing inside the heat exchanger 18 vaporizes to absorb heat of ambient air that is introduced so as to contact with the heat exchanger 18. An air-conditioning device uses low-temperature and low-pressure refrigerant decompressed by the expansion valve 16 to absorb heat of vaporization, required at the time when wet steam of refrigerant evaporates into refrigerant gas, from air-conditioning air flowing to the cabin of the hybrid vehicle to thereby cool the cabin of the hybrid vehicle. Air-conditioning air of which heat is absorbed by the heat exchanger 18 to decrease its temperature flows into the cabin of the hybrid vehicle to cool the cabin of the hybrid vehicle. Refrigerant absorbs heat from the surroundings in the heat exchanger 18 to be heated.

The heat exchanger 18 includes tubes and fins. The tubes flow refrigerant. The fins are used to exchange heat between refrigerant flowing through the tubes and air around the heat exchanger 18. Refrigerant in a wet steam state flows through the tubes. When refrigerant flows through the tubes, the refrigerant absorbs heat of air in the cabin of the hybrid vehicle as latent heat of vaporization via the fins to evaporate, and further becomes superheated steam because of sensible heat. Vaporized refrigerant flows into the compressor 12 via a refrigerant line 27. The compressor 12 compresses refrigerant flowing from the heat exchanger 18.

The refrigeration cycle 10 further includes the refrigerant line 21, refrigerant lines 22 and 24, the refrigerant line 25, a refrigerant line 26 and the refrigerant line 27. The refrigerant line 21 provides fluid communication between the compressor 12 and the first condenser 14. The refrigerant lines 22 and 24 provide fluid communication between the first condenser 14 and the second condenser 15. The refrigerant line 25 provides fluid communication between the second condenser 15 and the expansion valve 16. The refrigerant line 26 provides fluid communication between the expansion valve 16 and the heat exchanger 18. The refrigerant line 27 provides fluid communication between the heat exchanger 18 and the compressor 12.

The refrigerant line 21 is a line for flowing refrigerant from the compressor 12 to the first condenser 14. Refrigerant flows through the refrigerant line 21 from the outlet of the compressor 12 toward the inlet of the first condenser 14 between the compressor 12 and the first condenser 14. An ejector 140 is provided in the refrigerant line 21. The refrigerant line 21 is divided into a refrigerant line 21a on the upstream side of the ejector 140 and a refrigerant line 21b on the downstream side of the ejector 140. The refrigerant lines 22 to 25 are lines for flowing refrigerant from the first condenser 14 to the expansion valve 16. Refrigerant flows from the first condenser 14 to the second condenser 15 via the refrigerant lines 22 and 24 and refrigerant lines 23, 34 and 36.

The refrigerant line 26 is a line for flowing refrigerant from the expansion valve 16 to the heat exchanger 18. Refrigerant flows through the refrigerant line 26 from the outlet of the expansion valve 16 toward the inlet of the heat exchanger 18 between the expansion valve 16 and the heat exchanger 18. The refrigerant line 27 is a line for flowing refrigerant from the heat exchanger 18 to the compressor 12. Refrigerant flows through the refrigerant line 27 from the outlet of the heat exchanger 18 toward the inlet of the compressor 12 between the heat exchanger 18 and the compressor 12.

The refrigeration cycle 10 is formed such that the compressor 12, the first condenser 14, a cooling portion 30, the second condenser 15, the expansion valve 16 and the heat exchanger 18 are coupled by the refrigerant lines 21 to 27, 34 and 36. Note that refrigerant used in the refrigeration cycle 10 may be, for example, carbon dioxide, hydrocarbons, such as propane and isobutane, ammonia, chlorofluorocarbons, water, or the like.

The tank 40 functions as a gas-liquid separator. When refrigerant flowing from the first condenser 14 is in a gas-liquid two-phase state, the gas-liquid separator separates refrigerant into gaseous refrigerant and liquid refrigerant. Refrigerant liquid that is liquid refrigerant and refrigerant steam that is gaseous refrigerant are stored inside the tank 40. The refrigerant line 23, branched off from the refrigerant line 22, and the refrigerant line 34 are coupled to the tank 40.

Refrigerant is in a wet steam gas-liquid two-phase state, mixedly containing saturated liquid and saturated steam, on the outlet side of the first condenser 14. Refrigerant flowing out from the first condenser 14 is supplied to the tank 40 through the refrigerant line 22 and the refrigerant line 23. Refrigerant in a gas-liquid two-phase state, flowing from the refrigerant line 23 into the tank 40, is separated into gas and liquid inside the tank 40. The tank 40 separates refrigerant, condensed by the first condenser 14, into liquid-state refrigerant liquid and gaseous refrigerant steam and temporarily stores them.

The separated refrigerant liquid flows out to the outside of the tank 40 via the refrigerant line 34. The end portion of the refrigerant line 34 arranged in liquid inside the tank 40 forms an outlet port through which liquid refrigerant flows out from the tank 40. The separated refrigerant steam flows out to the outside of the tank 40 via the refrigerant line 23. The end portion of the refrigerant line 23 arranged in gas inside the tank 40 forms an outlet port through which gaseous refrigerant flows out from the tank 40. Gaseous refrigerant steam delivered from the tank 40 radiates heat to the surroundings in the second condenser 15 to be cooled to thereby condense.

Inside the tank 40, the refrigerant liquid accumulates at the lower side and the refrigerant steam accumulates at the upper side. The end portion of the refrigerant line 34 that delivers refrigerant liquid from the tank 40 is coupled to the bottom portion of the tank 40. Only refrigerant liquid is delivered from the bottom side of the tank 40 to the outside of the tank 40 via the refrigerant line 34. The end portion of the refrigerant line 23 that delivers refrigerant steam from the tank 40 is coupled to the ceiling portion of the tank 40. Only refrigerant steam is delivered from the ceiling side of the tank 40 to the outside of the tank 40 via the refrigerant line 23. By so doing, the tank 40 is able to reliably separate gaseous refrigerant and liquid refrigerant from each other.

The path through which refrigerant flows from the outlet of the first condenser 14 toward the inlet of the expansion valve 16 includes the refrigerant line 22, the refrigerant line 23, the refrigerant line 24 and the refrigerant line 25. The refrigerant line 22 is coupled from the outlet side of the first condenser 14 to a valve 28 (described later). The refrigerant line 23 is branched off from the refrigerant line 22 and is routed to the tank 40. The refrigerant line 24 is coupled from the valve 28 to the inlet side of the second condenser 15. The refrigerant line 25 flows refrigerant from the outlet side of the second condenser 15 to the expansion valve 16.

The path of refrigerant that flows between the first condenser 14 and the second condenser 15 includes the refrigerant line 23, the refrigerant line 34 and the refrigerant line 36. The refrigerant line 23 is branched off from the refrigerant line 22 and is coupled to the tank 40. The refrigerant line 34 provides fluid communication between the tank 40 and the cooling portion 30. The refrigerant line 36 provides fluid communication between the cooling portion 30 and the refrigerant line 24. Refrigerant liquid flows from the tank 40 to the cooling portion 30 via the refrigerant line 34. Refrigerant passing through the cooling portion 30 returns to the refrigerant line 24 via the refrigerant line 36. The cooling portion 30 is provided in the path of refrigerant flowing from the first condenser 14 toward the second condenser 15.

Point D shown in FIG. 1 indicates a coupling point between the refrigerant line 24 and the refrigerant line 36, that is, the downstream-side end portion of the refrigerant line 36.

The cooling system 1 further includes a path of refrigerant arranged in parallel with the valve 28. The cooling portion 30 is provided in that path of refrigerant. The cooling portion 30 includes a hybrid vehicle (HV) device 31 and a refrigerant line 32. The HV device 31 is an electrical device mounted on the hybrid vehicle. The refrigerant line 32 is a line through which refrigerant flows. The HV device 31 is an example of a heat generating source. One end portion of the refrigerant line 32 is connected to the refrigerant line 34. The other end portion of the refrigerant line 32 is connected to the refrigerant line 36.

The path of refrigerant, connected in parallel with the valve 28, includes the refrigerant line 23, the refrigerant line 34, the refrigerant line 32 and the refrigerant line 36. The refrigerant line 23 is branched off from the refrigerant line 22, and is coupled to the tank 40. The refrigerant line 34 is located on the upstream side (side closer to the tank 40) of the cooling portion 30. The refrigerant line 32 is included in the cooling portion 30. The refrigerant line 36 is located on the downstream side (side closer to the second condenser 15) of the cooling portion 30. The refrigerant line 34 is a line for flowing liquid refrigerant from the tank 40 to the cooling portion 30. The refrigerant line 36 is a line for flowing refrigerant from the cooling portion 30 to point D.

Refrigerant liquid flowing out from the tank 40 flows toward the cooling portion 30 via the refrigerant line 34. Refrigerant that flows to the cooling portion 30 and that flows via the refrigerant line 32 takes heat from the HV device 31, which serves as the heat generating source, to cool the HV device 31. The cooling portion 30 cools the HV device 31 by using liquid refrigerant that is separated in the tank 40 and that flows to the refrigerant line 32 via the refrigerant line 34. Refrigerant flowing through the refrigerant line 32 exchanges heat with the HV device 31 in the cooling portion 30 to cool the HV device 31, and the refrigerant is heated. Refrigerant further flows from the cooling portion 30 toward point D via the refrigerant line 36, and reaches the second condenser 15 via the refrigerant line 24.

The cooling portion 30 is configured to be able to exchange heat between the HV device 31 and refrigerant in the refrigerant line 32. In the present embodiment, the cooling portion 30, for example, has the refrigerant line 32 that is formed such that the outer peripheral surface of the refrigerant line 32 is in direct contact with the casing of the HV device 31. The refrigerant line 32 has a portion adjacent to the casing of the HV device 31. At that portion, heat is exchangeable between refrigerant, flowing through the refrigerant line 32, and the HV device 31.

The HV device 31 is directly connected to the outer periphery of the refrigerant line 32 that forms part of the path of refrigerant, routed from the first condenser 14 to the second condenser 15 in the refrigeration cycle 10, and is cooled. The HV device 31 is arranged on the outside of the refrigerant line 32, so the HV device 31 does not interfere with flow of refrigerant flowing inside the refrigerant line 32. Therefore, the pressure loss of the refrigeration cycle 10 does not increase, so the HV device 31 may be cooled without increasing the power of the compressor 12.

Alternatively, the cooling portion 30 may include a selected known heat pipe that is interposed between the HV device 31 and the refrigerant line 32. In this case, the HV device 31 is connected to the outer periphery of the refrigerant line 32 via the heat pipe, and heat is transferred from the HV device 31 to the refrigerant line 32 via the heat pipe to thereby cool the HV device 31. The HV device 31 serves as a heating portion for heating the heat pipe, and the refrigerant line 32 serves as a cooling portion for cooling the heat pipe to thereby increase the heat-transfer efficiency between the refrigerant line 32 and the HV device 31, so it is possible to improve the cooling efficiency of the HV device 31. For example, a Wick heat pipe may be used.

The heat pipe is able to reliably transfer heat from the HV device 31 to the refrigerant line 32, so there may be a distance between the HV device 31 and the refrigerant line 32, and complex arrangement of the refrigerant line 32 is not required to bring the refrigerant line 32 into contact with the HV device 31. As a result, it is possible to improve the flexibility of arrangement of the HV device 31.

The HV device 31 includes an electrical device that exchanges electric power to generate heat. The electrical device includes at least any one of, for example, an inverter used to convert direct-current power to alternating-current power, a motor generator that is a rotating electrical machine, a battery that is an electrical storage device, a step-up converter that is used to step up the voltage of to battery and a DC/DC converter that is used to step down the voltage of the battery. The battery is a secondary battery, such as a lithium ion battery and a nickel metal hydride battery. A capacitor may be used instead of the battery.

The heat exchanger 18 is arranged inside a duct 90 through which air flows. The heat exchanger 18 exchanges heat between refrigerant and air-conditioning air that flows through the inside of the duct 90 to adjust the temperature of air-conditioning air. The duct 90 has a duct inlet 91 and a duct outlet 92. The duct inlet 91 is an inlet from which air-conditioning air flows into the duct 90. The duct outlet 92 is an outlet from which air-conditioning air flows out from the duct 90. A fan 93 is arranged near the duct inlet 91 inside the duct 90.

As the fan 93 is driven, air flows inside the duct 90. As the fan 93 operates, air-conditioning air flows into the inside of the duct 90 via the duct inlet 91. Air flowing into the duct 90 may be outside air or may be air in the cabin of the hybrid vehicle. The arrow 95 in FIG. 1 indicates the flow of air-conditioning air that flows through the heat exchanger 18 and that exchanges heat with refrigerant in the refrigeration cycle 10. During cooling operation, air-conditioning air is cooled in the heat exchanger 18, and refrigerant receives heat transferred from air-conditioning air to be heated. The arrow 96 indicates the flow of air-conditioning air of which the temperature is adjusted in the heat exchanger 18 and that flows out from the duct 90 via the duct outlet 92.

Refrigerant passes through a refrigerant circulation path that is formed by sequentially connecting the compressor 12, the first condenser 14, the second condenser 15, the expansion valve 16 and the heat exchanger 18 by the refrigerant lines 21 to 27 to circulate in the refrigeration cycle 10. Refrigerant flows in the refrigeration cycle 10 so as to sequentially pass through points A, B, C, D, E and F shown in FIG. 1, and refrigerant circulates among the compressor 12, the first condenser 14, the second condenser 15, the expansion valve 16 and the heat exchanger 18.

Figure 2:
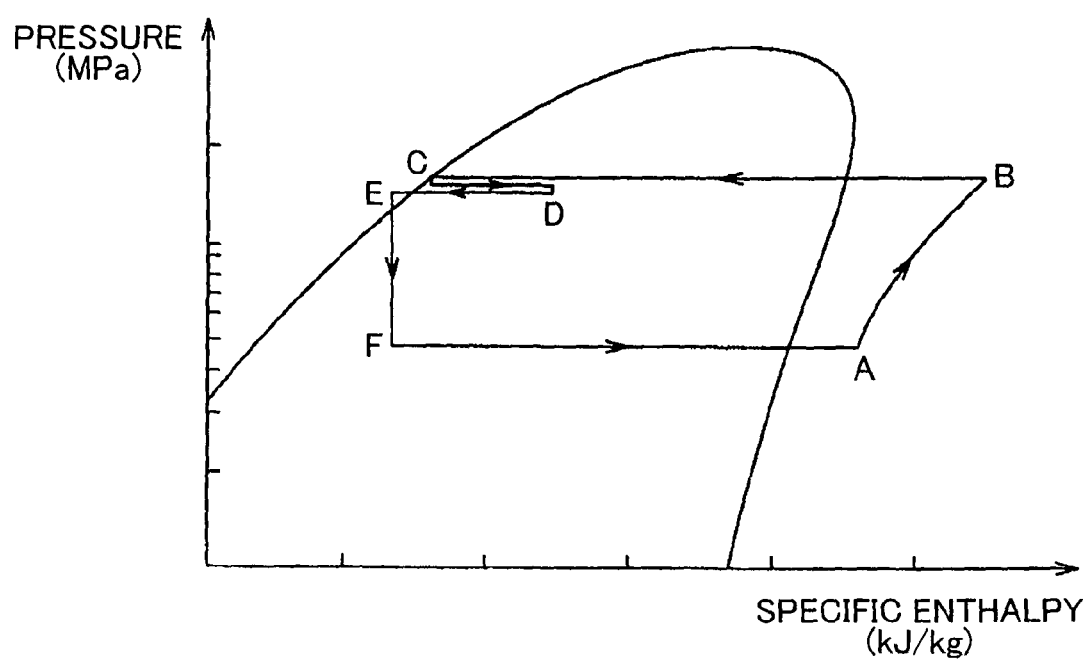
FIG. 2 is a Mollier chart that shows the state of refrigerant in a vapor compression refrigeration cycle.

FIG. 2 is a Mollier chart that shows the state of refrigerant in the refrigeration cycle 10. In FIG. 2, the abscissa axis represents the specific enthalpy of refrigerant, and the ordinate axis represents the absolute pressure of refrigerant. The unit of the specific enthalpy is kJ/kg, and the unit of the absolute pressure is MPa. The curve in the chart is the saturation vapor line and saturation liquid line of refrigerant.

FIG. 2 shows the thermodynamic state of refrigerant at points (that is, points A, B, C, D, E and F) in the refrigeration cycle 10 when refrigerant flows from the refrigerant line 22 at the outlet of the first condenser 14 into the refrigerant line 34 via the refrigerant line 23 and the tank 40, cools the HV device 31 and returns through the refrigerant line 36 to the refrigerant line 24 at the inlet of the second condenser 15 via point D. A path through which refrigerant flows at this time, that is, the refrigerant line 21, the refrigerant line 22, the refrigerant line 23, the refrigerant line 34, the refrigerant line 36 and the refrigerant lines 24 to 27, form a first line.

As shown in FIG. 2, refrigerant in a superheated steam state (point A), introduced into the compressor 12, is adiabatically compressed in the compressor 12 along a constant specific entropy line. As refrigerant is compressed, the refrigerant increases in pressure and temperature into high-temperature and high-pressure superheated steam having a high degree of superheat (point B), and the refrigerant flows to the first condenser 14. Gaseous refrigerant discharged from the compressor 12 releases heat to the surroundings to be cooled in the first condenser 14 to thereby condense (liquefy). Through heat exchange with outside air in the first condenser 14, the temperature of refrigerant decreases, and refrigerant liquefies. High-pressure refrigerant steam in the first condenser 14 becomes dry saturated steam from superheated steam with a constant pressure in the first condenser 14, releases latent heat of condensation to gradually liquefy into wet steam in a gas-liquid mixing state. Within the refrigerant in a gas-liquid two-phase state, condensed refrigerant is in a saturated liquid state (point C).

Refrigerant is separated into gaseous refrigerant and liquid refrigerant in the tank 40. Within the refrigerant separated into gas and liquid, liquid-phase refrigerant liquid flows from the tank 40 to the refrigerant line 32 of the cooling portion 30 via the refrigerant line 34, and cools the HV device 31. In the cooling portion 30, heat is released to liquid refrigerant in a saturated liquid state, which is condensed as it passes through the first condenser 14, to thereby cool the HV device 31. Refrigerant is heated by exchanging heat with the HV device 31, and the dryness of the refrigerant increases. Refrigerant receives latent heat from the HV device 31 to partially vaporize into wet steam that mixedly contain saturated liquid and saturated steam (point D).

After that, refrigerant flows into the second condenser 15. Wet steam of refrigerant exchanges heat with outside air in the second condenser 15 to be cooled to thereby condense again, becomes saturated liquid as the entire refrigerant condenses, and further releases sensible heat to become supercooled liquid (point E). After that, refrigerant flows into the expansion valve 16 via the refrigerant line 25. In the expansion valve 16, refrigerant in a supercooled liquid state is throttle-expanded, and the refrigerant decreases in temperature and pressure with the specific enthalpy unchanged to become low-temperature and low-pressure wet steam in a gas-liquid mixing state (point F).

Refrigerant in a wet steam state from the expansion valve 16 flows into the heat exchanger 18 via the refrigerant line 26. Refrigerant in a wet steam state flows into the tubes of the heat exchanger 18. When refrigerant flows through the tubes of the heat exchanger 18, the refrigerant absorbs heat of air in the cabin of the hybrid vehicle as latent heat of vaporization via the fins to evaporate with a constant pressure. As the entire refrigerant becomes dry saturated steam, the refrigerant steam further increases in temperature by sensible heat to become superheated steam (point A). After that, refrigerant is introduced into the compressor 12 via the refrigerant line 27. The compressor 12 compresses refrigerant flowing from the heat exchanger 18.

Refrigerant continuously repeats changes among the compressed state, the condensed state, the throttle-expanded state and the evaporated state in accordance with the above-described cycle. Note that, in the above description of the vapor compression refrigeration cycle, a theoretical refrigeration cycle 10 is described; however, in the actual refrigeration cycle 10, it is, of course, necessary to consider a loss in the compressor 12, a pressure loss of refrigerant and a heat loss.

During operation of the refrigeration cycle 10, refrigerant absorbs heat of vaporization from air in the cabin of the hybrid vehicle at the time when the refrigerant evaporates in the heat exchanger 18 that serves as an evaporator to thereby cool the cabin. In addition, high-pressure liquid refrigerant that flows out from the first condenser 14 and that is separated into gas and liquid in the tank 40 flows to the cooling portion 30 and exchanges heat with the HV device 31 to thereby cool the HV device 31. The cooling system 1 cools the HV device 31, which is the heat generating source mounted on the hybrid vehicle, by utilizing the refrigeration cycle 10 for air-conditioning the cabin of the hybrid vehicle. Note that the temperature required to cool the HV device 31 is desirably at least lower than the upper limit of a target temperature range of the HV device 31.

The refrigeration cycle 10 that is provided in order to cool a cooled portion in the heat exchanger 18 is utilized to cool the HV device 31, so it is not necessary to provide a device, such as an exclusive water circulation pump and a cooling fan, in order to cool the HV device 31. Therefore, it is possible to reduce components required to cool the HV device 31 and to simplify the system configuration, so it is possible to reduce the manufacturing cost of the cooling system 1. In addition, it is not necessary to operate a power source, such as a pump and a cooling fan, in order to cool the HV device 31, and power consumption for operating the power source is not required. Thus, it is possible to reduce power consumption for cooling the HV device 31.

In the first condenser 14, refrigerant just needs to be cooled into a wet steam state, and refrigerant in a gas-liquid mixing state is separated in the tank 40, and only refrigerant liquid in a saturated liquid state is supplied to the cooling portion 30. Refrigerant in a wet steam state, which receives latent heat of vaporization from the HV device 31 to be partially vaporized, is cooled again in the second condenser 15. Refrigerant changes in state at a constant temperature until the refrigerant in a wet steam state completely condenses into saturated liquid. The second condenser 15 further supercools liquid refrigerant to a degree of supercooling required to cool the cabin of the hybrid vehicle. A degree of supercooling of refrigerant does not need to be excessively increased, so the capacity of each of the first condenser 14 and the second condenser 15 may be reduced. Thus, it is possible to ensure the cooling performance for cooling the cabin, and it is possible to reduce the size of each of the first condenser 14 and the second condenser 15, so it is possible to obtain the cooling system 1 that is reduced in size and that is advantageous in installation on the vehicle.

The refrigerant lines 22 and 24 that do not pass through the cooling portion 30 and the refrigerant lines 32, 34 and 36 that form the path of refrigerant passing through the cooling portion 30 to cool the HV device 31 are provided in parallel with each other as the paths through which refrigerant flowing from the tank 40 toward the expansion valve 16. Therefore, only part of refrigerant flowing out from the first condenser 14 flows to the cooling portion 30. The amount of refrigerant required to cool the HV device 31 is caused to flow to the cooling portion 30, and the HV device 31 is appropriately cooled. Thus, it is possible to prevent excessive cooling of the HV device 31.

The path of refrigerant that directly flows from the first condenser 14 to the second condenser 15 and the path of refrigerant that flows from the first condenser 14 to the second condenser 15 via the cooling portion 30 are provided in parallel with each other, and only part of refrigerant is caused to flow to the refrigerant lines 34 and 36. By so doing, it is possible to reduce the pressure loss at the time when refrigerant flows through the cooling system for cooling the HV device 31. Not the entire refrigerant flows to the cooling portion 30. Therefore, it is possible to reduce the pressure loss associated with flow of refrigerant via the cooling portion 30, and, accordingly, it is possible to reduce power consumption required to operate the compressor 12 for circulating refrigerant.

When low-temperature and low-pressure refrigerant after passing through the expansion valve 16 is used to cool the HV device 31, the cooling performance of air in the cabin in the heat exchanger 18 reduces and the cooling performance for cooling the cabin decreases. In contrast to this, in the cooling system 1 according to the present embodiment, in the refrigeration cycle 10, high-pressure refrigerant discharged from the compressor 12 is condensed by both the first condenser 14 and the second condenser 15. The first condenser 14 and the second condenser 15 are arranged between the compressor 12 and the expansion valve 16, and the cooling portion 30 for cooling the HV device 31 is provided between the first condenser 14 and the second condenser 15. The second condenser 15 is provided in the path of refrigerant flowing from the cooling portion 30 toward the expansion valve 16.

By sufficiently cooling refrigerant, which receives latent heat of vaporization from the HV device 31 to be heated, in the second condenser 15, the refrigerant has a temperature and a pressure that are originally required to cool the cabin of the hybrid vehicle at the outlet of the expansion valve 16. Therefore, it is possible to sufficiently increase the amount of heat externally received when refrigerant evaporates in the heat exchanger 18. In this way, by setting the heat radiation performance for the second condenser 15 so as to be able to sufficiently cool refrigerant, the HV device 31 may be cooled without any influence on the cooling performance for cooling the cabin. Thus, both the cooling performance for cooling the HV device 31 and the cooling performance for cooling the cabin may be reliably ensured.

When refrigerant flowing from the first condenser 14 to the cooling portion 30 cools the HV device 31, the refrigerant receives heat from the HV device 31 to be heated. As refrigerant is heated to a saturated steam temperature or above and the entire amount of the refrigerant vaporizes in the cooling portion 30, the amount of heat exchanged between the refrigerant and the HV device 31 reduces, and the HV device 31 cannot be efficiently cooled, and, in addition, pressure loss at the time when the refrigerant flows in the line increases. Therefore, it is desirable to sufficiently cool refrigerant in the first condenser 14 such that the entire amount of refrigerant does not vaporize after cooling the HV device 31.

Specifically, the state of refrigerant at the outlet of the first condenser 14 is brought close to saturated liquid, and, typically, refrigerant is placed in a state on the saturated liquid line at the outlet of the first condenser 14. Because the first condenser 14 is capable of sufficiently cooling refrigerant in this way, the heat radiation performance of the first condenser 14 for causing refrigerant to release heat is higher than the heat radiation performance of the second condenser 15. By sufficiently cooling refrigerant in the first condenser 14 having relatively high heat radiation performance, refrigerant that has received heat from the HV device 31 may be maintained in a wet steam state, and a reduction in the amount of heat exchanged between refrigerant and the HV device 31 may be avoided, so it is possible to sufficiently cool the HV device 31. Refrigerant in a wet steam state after cooling the HV device 31 is efficiently cooled again in the second condenser 15, and is cooled into a supercooled liquid state below a saturated temperature. Thus, it is possible to provide the cooling system 1 that ensures both the cooling performance for cooling the cabin and the cooling performance for cooing the HV device 31.

Refrigerant in a gas-liquid two-phase state at the outlet of the first condenser 14 is separated into gaseous refrigerant and liquid refrigerant in the tank 40. The gaseous refrigerant separated in the tank 40 flows via the refrigerant lines 23 and 24 and is directly supplied to the second condenser 15. The liquid refrigerant separated in the tank 40 flows via the refrigerant line 34, and is supplied to the cooling portion 30 to cool the HV device 31. The liquid refrigerant is refrigerant in a just saturated liquid state. By taking only liquid refrigerant from the tank 40 and flowing the liquid refrigerant to the cooling portion 30, it is possible to cool the HV device 31 by fully utilizing the performance of the first condenser 14, so it is possible to provide the cooling system 1 having improved cooling performance for cooling the HV device 31.

Refrigerant in a saturated liquid state at the outlet of the tank 40 is introduced into the refrigerant line 32 that cools the HV device 31 to thereby make it possible to minimize gaseous refrigerant within refrigerant that flows in the cooling system for cooling the HV device 31, including the refrigerant lines 34 and 36 and the refrigerant line 32. Therefore, it is possible to suppress an increase in pressure loss due to an increase in flow rate of refrigerant steam flowing in the cooling system for cooling the HV device 31, and the power consumption of the compressor 12 for flowing refrigerant may be reduced, so it is possible to avoid deterioration of the performance of the refrigeration cycle 10.

Refrigerant liquid in a saturated liquid state is stored inside the tank 40. The tank 40 functions as a reservoir that temporarily stores refrigerant liquid that is liquid refrigerant inside. When refrigerant liquid in a predetermined amount is stored in the tank 40, the flow rate of refrigerant flowing from the tank 40 to the cooling portion 30 may be maintained at the time of fluctuations in load. Because the tank 40 has the function of storing liquid, serves as a buffer against load fluctuations and is able to absorb load fluctuations, the cooling performance for cooling the HV device 31 may be stabilized.

Referring back to FIG. 1, the cooling system 1 includes a switching device 52. The switching device 52 includes the valve 28, a valve 57 and a valve 58.

A path that flows refrigerant from the first condenser 14 to the second condenser 15 includes a first path and a second path that is provided in parallel with the first path. The first path directly flows refrigerant from the first condenser 14 to the second condenser 15. The second path flows refrigerant from the first condenser 14 to the second condenser 15 via the cooling portion 30. The valve 28 is provided in the first path. The valve 28 changes its valve opening degree to increase or reduce the pressure loss of refrigerant flowing from the refrigerant line 22 to the refrigerant line 24 to thereby selectively adjust the flow rate of refrigerant directly flowing from the refrigerant line 22 to the refrigerant line 24 and the flow rate of refrigerant flowing in the cooling system for cooling the HV device 31, including the refrigerant line 32.

For example, as the valve 28 is fully closed to set the valve opening degree at 0%, the entire amount of refrigerant from the first condenser 14 flows into the refrigerant line 34 via the tank 40. When the valve opening degree of the valve 28 is increased, the flow rate of refrigerant that flows directly from the first condenser 14 to the second condenser 15 via the valve 28 increases and the flow rate of refrigerant that flows to the refrigerant line 32 via the refrigerant line 34 to cool the HV device 31 reduces. When the valve opening degree of the valve 28 is reduced, the flow rate of refrigerant that directly flows from the first condenser 14 to the second condenser 15 via the valve 28 reduces and the flow rate of refrigerant that flows via the refrigerant line 32 to cool the HV device 31 increases.

As the valve opening degree of the valve 28 is increased, the flow rate of refrigerant that cools the HV device 31 reduces, so cooling performance for cooling the HV device 31 decreases. As the valve opening degree of the valve 28 reduces, the flow-rate of refrigerant that cools the HV device 31 increases, so cooling performance for cooling the HV device 31 improves. The valve 28 is used to make it possible to optimally adjust the amount of refrigerant flowing to the HV device 31, so it is possible to reliably prevent excessive cooling of the HV device 31, and, in addition, it is possible to reliably reduce pressure loss associated with flow of refrigerant in the cooling system for cooling the HV device 31 and the power consumption of the compressor 12 for circulating refrigerant.

The cooling system 1 further includes a communication line 51. The communication line 51 provides fluid communication between the refrigerant line 21, through which refrigerant flows between the compressor 12 and the first condenser 14, and the refrigerant line 36 on the downstream side of the cooling portion 30 between the refrigerant lines 34 and 36 that flow refrigerant through the cooling portion 30. The refrigerant line 36 is divided into a refrigerant line 36a on the upstream side of a branching portion from which the communication line 51 is branched off and a refrigerant line 36b on the downstream side of the branching portion from which the communication line 51 is branched off.

The valve 57 is provided in the refrigerant line 36. The valve 57 is used to switch the state of fluid communication of the refrigerant line 36. The valve 58 is provided in the communication line 51. The valve 58 is used to switch the state of fluid communication in the communication line 51. By switching the path of refrigerant using the valves 57 and 58, refrigerant after cooling the HV device 31 may be caused to flow to any selected one of the paths, that is, to the second condenser 15 via the refrigerant lines 36b and 24 or to the first condenser 14 via the communication line 51 and the refrigerant line 21b.

More specifically, during cooling operation of the refrigeration cycle 10, the valve 58 is fully closed (valve opening degree 0%), and the valve opening degree of the valve 28 and the valve opening degree of the valve 57 are adjusted such that a sufficient amount of refrigerant flows through the cooling portion 30. By so doing, refrigerant flowing through the refrigerant line 36a after cooling the HV device 31 may be reliably caused to flow to the second condenser 15 via the refrigerant line 36b.

On the other hand, during a stop of the refrigeration cycle 10, the valve 58 is fully open and the valve 57 is fully closed, and, furthermore, the valve 28 is fully closed. By so doing, it is possible to cause refrigerant flowing through the refrigerant line 36a after cooling the HV device 31 to flow to the first condenser 14 via the communication line 51, thus making it possible to form an annular path that causes refrigerant to circulate between the cooling portion 30 and the first condenser 14 without passing through the compressor 12.

Figure 3:
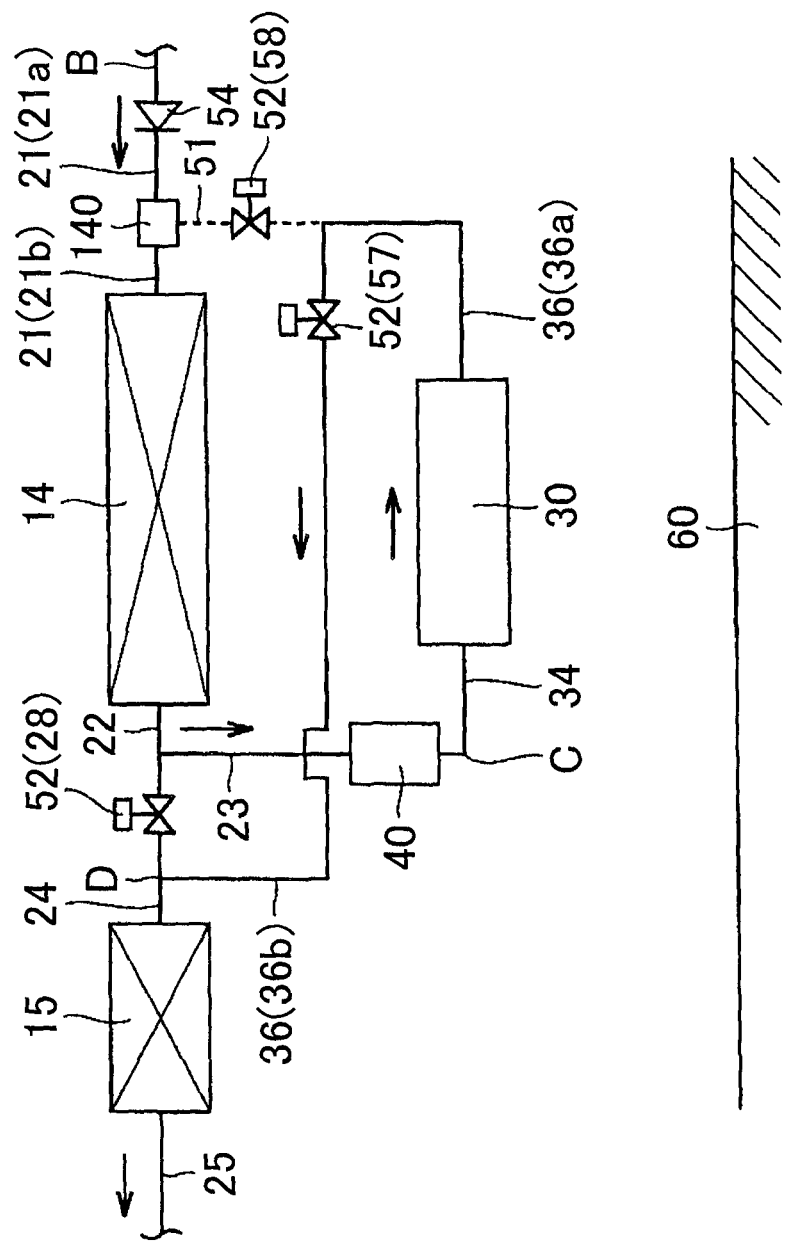
FIG. 3 is a schematic view that shows the flow of refrigerant that cools an HV device during operation of the vapor compression refrigeration cycle.
Figure 4:
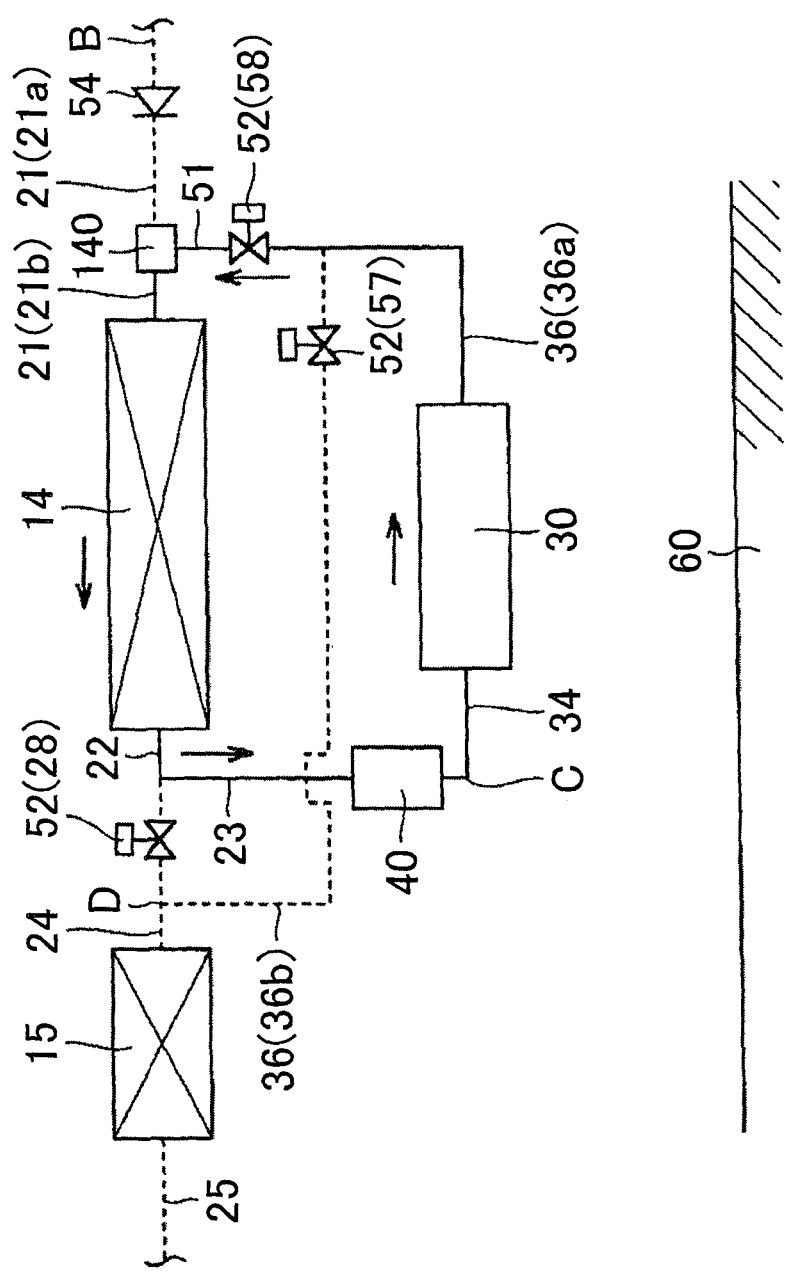
FIG. 4 is a schematic view that shows the flow of refrigerant that cools the HV device during a stop of the vapor compression refrigeration cycle.

FIG. 3 is a schematic view that shows the flow of refrigerant that cools the HV device 31 during operation of the refrigeration cycle 10. FIG. 4 is a schematic view that shows the flow of refrigerant that cools the HV device 31 during a stop of the refrigeration cycle 10. FIG. 5 is a table that shows the opening degree of the switching device 52 (valves 28, 57 and 58) in each operation mode of the cooling system 1. Between the operation modes shown in FIG. 5, an "air conditioner operation mode" indicates the case where the refrigeration cycle 10 shown in FIG. 3 is operated, that is, the case where the compressor 12 is operated to flow refrigerant through the whole of the refrigeration cycle 10. On the other hand, a "heat pipe operation mode" shows the case where the refrigeration cycle 10 shown in FIG. 4 is stopped, that is, the case where the compressor 12 is stopped and refrigerant is caused to circulate via the annular path that connects the cooling portion 30 to the first condenser 14. Note that, in the heat pipe operation mode, when dryout is likely to occur, the compressor 12 may temporarily operate. By so doing, it is possible to suppress dryout by increasing the amount of refrigerant in a second line.

As shown in FIG. 3 and FIG. 5, during "air conditioner operation mode" in which the compressor 12 is driven and the refrigeration cycle 10 is operated, the valve 28 and the valve 57 are adjusted in valve opening degree such that a sufficient amount of refrigerant flows through the cooling portion 30. The valve 58 is fully closed. In this way, the switching device 52 is operated so as to flow refrigerant from the cooling portion 30 to the expansion valve 16 via the second condenser 15. By so doing, the path of refrigerant is selected such that refrigerant flows through the whole of the cooling system 1. Therefore, the cooling performance of the refrigeration cycle 10 may be ensured, and the HV device 31 may be efficiently cooled.

As shown in FIG. 4 and FIG. 5, during "heat pipe operation mode" in which the compressor 12 is stopped and the refrigeration cycle 10 is stopped, the switching device 52 is operated such that refrigerant circulates from the cooling portion 30 to the first condenser 14. That is, as the valve 57 is fully closed, the valve 58 is fully open and the valve 28 is fully closed, refrigerant does not flow from the refrigerant line 36a to the refrigerant line 36b but flows via the communication line 51. By so doing, a closed annular path is formed. The closed annular path is routed from the first condenser 14 to the cooling portion 30 via the refrigerant line 22, the refrigerant line 23 and the refrigerant line 34 sequentially, further passes through the refrigerant line 36a, the communication line 51 and the refrigerant line 21b sequentially and returns to the first condenser 14. The path through which refrigerant flows at this time, that is, the refrigerant line 21b, the refrigerant line 22, the refrigerant line 23, the refrigerant line 34, the refrigerant line 36a and the communication line 51, form the second line.

It is possible to circulate refrigerant between the first condenser 14 and the cooling portion 30 via the annular path without operating the compressor 12. When refrigerant cools the HV device 31, the refrigerant receives latent heat of vaporization from the HV device 31 to evaporate. Refrigerant steam vaporized by exchanging heat with the HV device 31 flows to the first condenser 14 via the refrigerant line 36a, the communication line 51 and the refrigerant line 21 sequentially. In the first condenser 14, refrigerant steam is cooled to condense by travelling wind of the hybrid vehicle or draft from the radiator fan 42. Refrigerant liquid liquefied in the first condenser 14 returns to the cooling portion 30 via the refrigerant lines 22, 23 and 34.

In this way, a heat pipe in which the HV device 31 serves as a heating portion and the first condenser 14 serves as a cooling portion is formed by the annular path that passes through the cooling portion 30 and the first condenser 14.

Thus, when the refrigeration cycle 10 is stopped, that is, when a cooler for the hybrid vehicle is stopped as well, the HV device 31 may be reliably cooled without the necessity of start-up of the compressor 12. Because the compressor 12 is not required to constantly operate in order to cool the HV device 31, the power consumption of the compressor 12 is reduced to thereby make it possible to improve the fuel economy of the hybrid vehicle and, in addition, to extend the life of the compressor 12, so it is possible to improve the reliability of the compressor 12.

FIG. 3 and FIG. 4 show a ground 60. The cooling portion 30 is arranged below the first condenser 14 in the vertical direction perpendicular to the ground 60.

In this case, refrigerant steam heated and vaporized in the cooling portion 30 goes up in the annular path, reaches the first condenser 14, is cooled in the first condenser 14, condenses into liquid refrigerant, goes down in the annular path by the action of gravity and returns to the cooling portion 30. That is, a thermo-siphon heat pipe is formed of the cooling portion 30, the first condenser 14 and the paths of refrigerant (that is, the second line) that connect them. It is possible to improve the heat transfer efficiency from the HV device 31 to the first condenser 14 by forming the heat pipe, so, when the refrigeration cycle 10 is stopped as well, it is possible to further efficiently cool the HV device 31 without additional power.

Referring back to FIG. 1, the cooling system 1 further includes the ejector 140. The ejector 140 is provided between the compressor 12 and the first condenser 14. When refrigerant flows from the compressor 12 to the first condenser 14, the ejector 140 generates suction force for drawing refrigerant from the second line, and causes the refrigerant flowing in the second line to join into refrigerant discharged from the compressor 12.

During the heat pipe operation mode, if the amount of refrigerant in the second line is insufficient for the amount of heat radiation that is required to protect the HV device 31, a phenomenon called dryout that all the refrigerant dries out may occur. When dryout occurs, cooling performance for cooling the HV device 31 decreases, so the temperature of the HV device 31 may increase. Then, by temporarily operating the compressor 12, refrigerant is supplied into the second line via the ejector 140. By so doing, it is possible to increase the amount of refrigerant in the second line.

The ejector 140 generates suction force for drawing refrigerant from the second line when refrigerant flows from the compressor 12 to the first condenser 14. By so doing, it is possible to increase the amount of refrigerant in a heat pipe cycle formed between the first condenser 14 and the cooling portion 30 while facilitating circulation of refrigerant in the heat pipe cycle. Thus, in comparison with the case where a mere confluent valve is used, it is possible to effectively suppress dryout.

Figure 6:
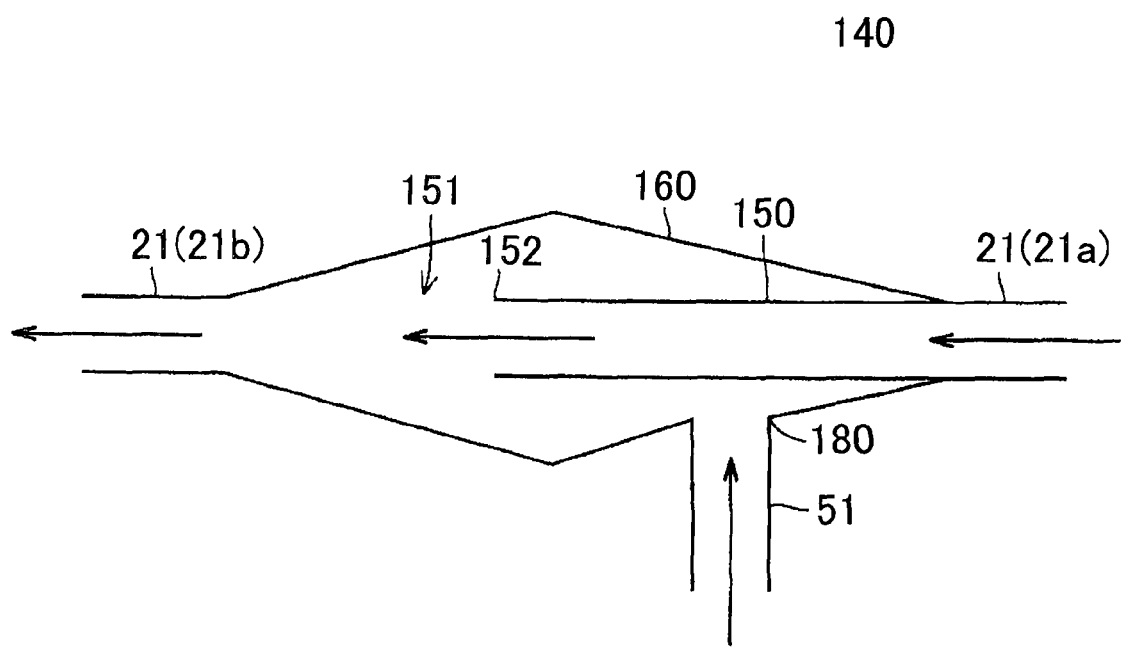
FIG. 6 is a view that shows an example of the structure of an ejector shown in FIG. 1.

FIG. 6 is a view that shows an example of the structure of the ejector 140 shown in FIG. 1. As shown in FIG. 6, the ejector 140 includes a first pipe 150, a second pipe 160, a confluent portion 151 and a connecting portion 180.

One end of the first pipe 150 is connected to the refrigerant line 21a, and refrigerant discharged from the compressor 12 is ejected from the other end of the first pipe 150. The second pipe 160 is formed on the outer peripheral side of the first pipe 150. One end of the second pipe 160 is connected to the outer periphery of the first pipe 150, and the other end of the second pipe 160 is connected to the refrigerant line 21b. That is, the second pipe 160 forms a closed space that covers an end portion 152 of the first pipe 150. The connecting portion 180 is a portion at which the communication line 51 is connected to the second pipe 160. Refrigerant from the communication line 51 is drawn into the second pipe 160 via the connecting portion 180. Refrigerant drawn into the second pipe 160 from the communication line 51 joins at the confluent portion 151 into refrigerant flowing in the first pipe 150 from the compressor 12. The connecting portion 180 is arranged upstream of the confluent portion 151.

Refrigerant compressed in the compressor 12 is ejected from the first pipe 150 inside the second pipe 160, and decreases in pressure as the flow rate increases. By so doing, the pressure in the closed space decreases, so suction force for drawing refrigerant from the communication line 51 to the second pipe 160 is generated. Due to the suction force, circulation of refrigerant flowing through the second line is facilitated.

In this way, by providing the ejector 140, it is possible to increase the amount of refrigerant in the second line while facilitating circulation of refrigerant in the second line. Thus, it is possible to suppress dryout. Therefore, it is possible to suppress an increase in the temperature of the HV device 31.

In addition, the connecting portion 180 of the ejector 140 is arranged upstream of the confluent portion 151, so it is possible to cause two flows of refrigerant to join with each other in a state where the flow direction of refrigerant compressed in the compressor 12 is aligned in the flow direction of refrigerant drawn from the communication line 51 into the second pipe 160. Therefore, it is possible to prevent backflow of refrigerant, compressed in the compressor 12, to the connecting portion 180. Thus, it is possible to further facilitate circulation of refrigerant in the second line.

Referring back to FIG. 1, the switching device 52 may be formed of a three-way valve instead of the above-described valves 57 and 58. The three-way valve is arranged at the branching portion between the refrigerant line 36 and the communication line 51. In this case, a space required to arrange the three-way valve is smaller than a space required to arrange the two valves 57 and 58, and the three-way valve is used to make it possible to provide the cooling system 1 having a further reduced size and excellent vehicle mountability.

The cooling system 1 further includes a check valve 54. The check valve 54 is arranged in the refrigerant line 21a. The check valve 54 allows flow of refrigerant from the compressor 12 toward the first condenser 14 and prohibits flow of refrigerant in the opposite direction. By so doing, during the heat pipe operation mode shown in FIG. 4, a closed loop refrigerant path for circulating refrigerant between the first condenser 14 and the cooling portion 30 may be reliably formed.

By providing the check valve 54, it is possible to reliably prohibit flow of refrigerant from the communication line 51 toward the side adjacent to the compressor 12, so it is possible to prevent a decrease in the cooling performance for cooling the HV device 31 during a stop of the refrigeration cycle 10, using the heat pipe that forms the annular refrigerant path. Thus, when the cooler for the cabin of the hybrid vehicle is stopped as well, it is possible to efficiently cool the HV device 31.

FIG. 7 is a flowchart that shows an example of a control method for the cooling system 1. Note that the control is not limited to software processing; the control may be processed by exclusive hardware (electronic circuit).

As shown in FIG. 7, first, in step (S10), it is determined whether an air conditioner is turned on. As a passenger operates an air-conditioning control panel provided on an instrument panel at the front of the cabin of the hybrid vehicle, the air conditioner is turned on or off.

When it is determined in step (S10) that the air conditioner is turned on, the process proceeds to step (S20), and the cooling system 1 cools the HV device 31 in the air conditioner operation mode. That is, signals for instructing the switching device 52 to open or close are transmitted to the valves 28, 57 and 58. By so doing, the valve 58 is fully closed, and the valve 57 and the valve 28 are adjusted in opening degree. By so doing, within refrigerant discharged from the compressor 12, a sufficient amount of refrigerant for cooling the HV device 31 is caused to flow to the cooling portion 30. Refrigerant that has exchanged heat with air in the first condenser 14 to be cooled is caused to flow through the cooling portion 30, and heat is exchanged between refrigerant, flowing through the refrigerant line 32, and the HV device 31. By so doing, the HV device 31 is cooled.

Other than the case where the passenger of the hybrid vehicle operates the control panel to turn on the air conditioner, the HV device 31 may be cooled in the air conditioner operation mode when it is determined that the HV device 31 needs to be cooled in the air conditioner operation mode. For example, when the outside air temperature is higher than a predetermined temperature (for example, 25° C.), when the temperature of air-conditioning air is higher than a predetermined temperature (for example, 20° C.) or when the amount of refrigerant liquid in the tank 40 is smaller than a predetermined amount, the compressor 12 may be started up.

Alternatively, for example, when the hybrid vehicle travels in a situation that the amount of heat generated by the HV device 31 is large, such as when the hybrid vehicle travels on an uphill, the HV device 31 may be cooled in the air conditioner operation mode. The cooling performance of the cooling system 1 for cooling the HV device 31 is relatively high in the air conditioner operation mode in which the compressor 12 is operated as compared with the heat pipe operation mode. Therefore, when the amount of heat generated by the HV device 31 is large, the HV device 31 is cooled by operating the cooling system 1 in the air conditioner operation mode. By so doing, it is possible to reliably prevent overheating of the HV device 31.

When it is determined in step (S10) that the air conditioner is turned off, the process proceeds to step (S30), and the cooling system 1 cools the HV device 31 in the heat pipe operation mode. That is, signals for instructing the switching device 52 to open or close are transmitted to the valves 28, 57 and 58. By so doing, the valve 57 is fully closed, the valve 58 is fully opened, and the valve 28 is fully closed. By so doing, the annular path that circulates refrigerant between the cooling portion 30 and the first condenser 14 is formed, and the thermo-siphon heat pipe is formed. Liquid refrigerant cooled in the first condenser 14 is caused to flow to the cooling portion 30 by the action of gravity, and heat is exchanged between refrigerant flowing through the refrigerant line 32 and the HV device 31. By so doing, the HV device 31 is cooled. Refrigerant steam heated and vaporized in the cooling portion 30 goes up in the annular path, and reaches the first condenser 14 again.

Subsequently, in step (S40), it is determined whether occurrence of dryout has been detected. For example, the cooling system 1 determines that dryout has occurred when a temperature detected by a sensor that detects the temperature of a heat generating component of the HV device 31 exceeds an upper limit value. The cooling system 1 may determine whether dryout has occurred on the basis of a difference between the temperature of refrigerant flowing into the cooling portion 30 and the temperature of refrigerant flowing out from the cooling portion 30. Furthermore, the cooling system 1 may determine whether dryout has occurred when a temperature detected by a sensor that detects the surface temperature of the cooling portion 30 exceeds an upper limit value. In this case, the temperature sensor may be installed near a refrigerant flow passage and the heat generating component.

When it is determined in step (S40) that dryout has occurred, the process proceeds to step (S50), and the cooling system 1 temporarily operates the compressor 12. By so doing, refrigerant compressed in the compressor 12 is supplied into the second line via the ejector 140. At this time, the ejector 140 is provided, so it is possible to supply an amount of refrigerant, corresponding to an insufficient amount, to the second line while facilitating circulation of refrigerant in the second line. Thus, it is possible to suppress dryout. Therefore, it is possible to suppress an increase in the temperature of the HV device 31.

When it is determined in step (S40) that dryout has not occurred, the process proceeds to step (S60), and the cooling system 1 stops the compressor 12.

As described above, in this embodiment, it is possible to cool the HV device 31, which is the heat generating source, in both operation modes, that is, the "air conditioner operation mode" in which air conditioning is performed and the "heat pipe operation mode" in which air conditioning is stopped. In the heat pipe operation mode, it is possible to cool the HV device 31 with the use of the heat pipe cycle, so it is not required to constantly operate the compressor 12 in order to cool the HV device 31. Therefore, it is possible to improve the fuel economy of the hybrid vehicle by reducing the power consumption of the compressor 12 and, in addition, it is possible to extend the life of the compressor 12, so it is possible to improve the reliability of the compressor 12. The cooling system 1 includes the ejector 140 provided between the compressor 12 and the first condenser 14. The ejector 140 generates suction force for drawing refrigerant from the second line when refrigerant flows from the compressor 12 to the first condenser 14. By so doing, it is possible to increase the amount of refrigerant in the heat pipe cycle formed between the first condenser 14 and the cooling portion 30 while facilitating circulation of refrigerant in the heat pipe cycle. Thus, according to the above embodiment, it is possible to suppress dryout.

When refrigerant flows due to inertial force in the first pipe 150 of the ejector 140 after the compressor 12 is stopped as well, suction force for drawing refrigerant from the communication line 51 to the second pipe 160 occurs. Therefore, it is possible to resolve dryout by driving the compressor 12 in a short period of time.

In the above embodiment, the connecting portion 180 of the ejector 140 is arranged upstream of the confluent portion 151. By so doing, it is possible to cause two flows of refrigerant to join with each other in a state where the flow direction of refrigerant compressed in the compressor 12 is aligned in the flow direction of refrigerant drawn from the communication line 51 into the second pipe 160. Therefore, it is possible to prevent backflow of refrigerant, compressed in the compressor 12, to the connecting portion 180. Thus, it is possible to further facilitate circulation of refrigerant in the second line.

In the above embodiment, the cooling system 1 controls the open/close states of the switching device 52 in response to operation or stop of air conditioning. By so doing, it is possible to further reliably switch between the air conditioner operation mode and the heat pipe operation mode, so it is possible to cause refrigerant to flow through an appropriate path in each operation mode.

In the above embodiment, the cooling system 1 further includes the check valve that interrupts flow of refrigerant from the first condenser 14 to the compressor 12. By so doing, during the heat pipe operation mode, it is possible to reliably form the closed loop refrigerant path for circulating refrigerant between the first condenser 14 and the cooling portion 30.

In the above embodiment, the cooling portion 30 is arranged vertically below the first condenser 14. By so doing, refrigerant steam heated and vaporized in the cooling portion 30 goes up in the annular path, reaches the first condenser 14, is cooled in the first condenser 14, condenses into liquid refrigerant, goes down in the annular path by the action of gravity and returns to the cooling portion 30. Therefore, it is possible to improve the heat transfer efficiency from the HV device 31 to the first condenser 14 by forming the heat pipe, so, when the refrigeration cycle 10 is stopped as well, it is possible to further efficiently cool the HV device 31 without additional power.

In the above embodiment, the cooling system 1 further includes the tank 40 that stores liquid refrigerant that flows from the first condenser 14 to the cooling portion 30. By so doing, it is possible to extract only liquid refrigerant from the tank 40 and flow the refrigerant to the cooling portion 30. Therefore, it is possible to cool the HV device 31 by fully utilizing the performance of the first condenser 14, so it is possible to provide the cooling system 1 having improved cooling performance for cooling the HV device 31.

Note that the cooling system according to the invention may be applied to not only a hybrid vehicle that uses an engine and an electric motor as power sources but also an electric vehicle that uses only an electric motor as a power source and a fuel-cell vehicle.

Note that, in the above-described embodiment, the cooling system 1 that cools an electrical device mounted on the hybrid vehicle is described using the HV device 31 as an example. The electrical device is not limited to the illustrated electrical devices, such as an inverter and a motor generator. The electrical device may be any electrical device as long as it generates heat when it is operated.

Note that, in the above-described embodiment, the cooling system 1 that includes the check valve 54 is described. Instead, the cooling system 1 may not include the check valve 54.

Note that, in the above description, the HV device 31 corresponds to one example of a "heat generating source" in the invention, and the tank 40 corresponds to one example of a "reservoir" according to the invention. In addition, the valve 28 corresponds to one example of a "first valve" according to the invention, the valve 57 corresponds to one example of a "second valve" according to the invention, and the valve 58 corresponds to one example of a "third valve" according to the invention.

The embodiment described above should be regarded as only illustrative in every respect and not restrictive The scope of the invention is indicated not by the above-described embodiment but by the appended claims, and is intended to include all modifications within the meaning and scope equivalent to the scope of the appended claims.

What is claimed is:

1. A cooling system comprising:
 a compressor configured to compress refrigerant flowing inside the cooling system;
 a first condenser configured to cool the refrigerant;
 a cooling portion configured to cool a heat generating source using the refrigerant;
 a heat exchanger configured to perform air conditioning using the refrigerant;
 a first line configured to form a vapor compression refrigeration cycle by flowing the refrigerant in order of the heat exchanger, the compressor, the first condenser and the cooling portion;
 a second line configured to form a heat pipe by circulating the refrigerant between the first condenser and the cooling portion, wherein the heat pipe is configured to operate in a case where the compressor is stopped;
 a switching device configured to flow the refrigerant through the first line when the air conditioning is performed and to flow the refrigerant through the second line when the air conditioning is stopped; and
 an ejector provided between the compressor and the first condenser, the ejector being configured to draw the refrigerant from the second line and to join the drawn refrigerant into the refrigerant from the compressor when the refrigerant flows from the compressor to the first condenser.

2. The cooling system according to claim 1, wherein the ejector includes: a first pipe configured to flow the refrigerant discharged from the compressor; a second pipe configured to be formed on an outer peripheral side of the first pipe and the second line being connected to the second pipe; and a confluent portion used to join the refrigerant flowing through the second pipe into the refrigerant flowing through the first pipe, and the second line is connected to the second pipe at a location upstream of the confluent portion.

3. The cooling system according to claim 1, further comprising:
 a second condenser configured to cool the refrigerant, wherein
 the first line flows the refrigerant in order of the heat exchanger, the compressor, the first condenser, the cooling portion and the second condenser,
 the switching device includes: a first valve provided in a first tube provided in parallel with the cooling portion, the first tube flowing the refrigerant from the first condenser to the second condenser; a second valve provided in a second tube flowing the refrigerant from the cooling portion to the second condenser; and a third valve provided in a third tube branching off from the second tube, the third tube flowing the refrigerant from the cooling portion to the ejector, wherein
 when the refrigerant is caused to flow through the first line, the second valve is opened and the third valve is closed, and
 when the refrigerant is caused to flow through the second line, the second valve is closed and the third valve is opened.

4. The cooling system according to claim 1, further comprising:
 a check valve interrupting flow of the refrigerant from the first condenser to the compressor.

5. The cooling system according to claim 1, wherein the cooling portion is arranged vertically below the first condenser.

6. The cooling system according to claim 1, further comprising:
 a reservoir storing the refrigerant in a liquid phase, the refrigerant flowing from the first condenser to the cooling portion.

7. The cooling system according to claim 1, wherein the heat generating source includes an electrical device mounted on a vehicle.

8. A vehicle comprising:
a cooling system, the cooling system comprises:
a compressor configured to compress refrigerant flowing inside the cooling system;
a first condenser configured to cool the refrigerant;
a cooling portion configured to cool a heat generating source using the refrigerant;
a heat exchanger configured to perform air conditioning using the refrigerant;
a first line configured to form a vapor compression refrigeration cycle by flowing the refrigerant in order of the heat exchanger, the compressor, the first condenser and the cooling portion;
a second line configured to form a heat pipe by circulating the refrigerant between the first condenser and the cooling portion, wherein the heat pipe is configured to operate in a case where the compressor is stopped;
a switching device configured to flow the refrigerant through the first line when the air conditioning is performed and to flow the refrigerant through the second line when the air conditioning is stopped; and
an ejector provided between the compressor and the first condenser, the ejector being configured to draw the refrigerant from the second line and to join the drawn refrigerant into the refrigerant from the compressor when the refrigerant flows from the compressor to the first condenser.

* * * * *